United States Patent
Kanamatareddy

(10) Patent No.: US 9,591,472 B2
(45) Date of Patent: Mar. 7, 2017

(54) GLOBAL MOBILITY INFRASTRUCTURE FOR USER DEVICES

(71) Applicant: International Business Machines Corporation, Armonk, NY (US)

(72) Inventor: Ravi Kumar Reddy Kanamatareddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,246

(22) Filed: Nov. 30, 2015

(65) Prior Publication Data

US 2016/0080927 A1 Mar. 17, 2016

Related U.S. Application Data

(63) Continuation of application No. 14/051,528, filed on Oct. 11, 2013, now Pat. No. 9,253,618, which is a
(Continued)

(51) Int. Cl.
*H04W 4/00* (2009.01)
*H04W 24/00* (2009.01)
(Continued)

(52) U.S. Cl.
CPC ........ *H04W 8/08* (2013.01); *G06F 17/30528* (2013.01); *H04W 4/003* (2013.01);
(Continued)

(58) Field of Classification Search
CPC .... H04W 72/0453; H04W 4/02; H04W 48/02
(Continued)

(56) References Cited

U.S. PATENT DOCUMENTS 6,850,764 B1 * 2/2005 Patel ................ H04W 72/0453
370/328
7,840,226 B1 * 11/2010 Walsh ................... H04L 63/107
379/142.05
(Continued)

FOREIGN PATENT DOCUMENTS

| WO | WO9704611 | 2/1997 |
| WO | WO0176170 | 10/2001 |
| WO | WO02063911 | 8/2002 |

OTHER PUBLICATIONS

Notice of Allowance (Mail Date Aug. 19, 2013) for U.S. Appl. No. 12/610,140, filed Oct. 30, 2009, Confirmation No. 9817.
(Continued)

*Primary Examiner* — William D Cumming
(74) *Attorney, Agent, or Firm* — Schmeiser, Olsen & Watts, LLP; John Pivnichny

(57) ABSTRACT

Real-time mobility data relating to a user and devices associated with the user are collected. The collected mobility data to a device being used in a respective environment is applied. The operation of the device based on the applied data is activated and controlled. The mobility database is updated with new data relating to the location of the user as the user enters a new operating environment. New data includes mobility and environmental data relating to a third-party. The third-party data is relevant to the user and to operation of a mobile device.

20 Claims, 9 Drawing Sheets

Related U.S. Application Data continuation of application No. 12/610,140, filed on Oct. 30, 2009, now Pat. No. 8,750,824.

(51) Int. Cl.

| | | |
|---|---|---|
| *H04W 8/08* | (2009.01) |
| *G06F 17/30* | (2006.01) |
| *H04W 8/02* | (2009.01) |
| *H04W 4/24* | (2009.01) |
| *H04M 15/00* | (2006.01) |

(52) U.S. Cl.
CPC ............... *H04W 4/24* (2013.01); *H04W 8/02* (2013.01); *H04M 15/00* (2013.01); *H04M 2215/32* (2013.01)

(58) Field of Classification Search
USPC .......... 455/435.2, 456.1, 466; 370/328, 352; 379/142.05
See application file for complete search history.

(56) References Cited

U.S. PATENT DOCUMENTS

| | | | |
|---|---|---|---|
| 8,611,935 B2* | 12/2013 | Duarte | G06Q 50/01 455/466 |
| 8,750,824 B2* | 6/2014 | Kanamatareddy | G06F 17/30528 370/352 |
| 9,253,618 B2* | 2/2016 | Kanamatareddy | G06F 17/30528 |
| 2003/0157938 A1 | 8/2003 | Haase et al. | |
| 2007/0032235 A1* | 2/2007 | Wahl | H04W 48/08 455/435.2 |
| 2008/0042808 A1 | 2/2008 | Agrawal et al. | |
| 2008/0175368 A1 | 7/2008 | Agrawal et al. | |
| 2010/0159945 A1* | 6/2010 | Brisebois | H04W 4/02 455/456.1 |

OTHER PUBLICATIONS

Response (Jul. 11, 2013) for U.S. Appl. No. 12/610,140, filed Oct. 30, 2009, Confirmation No. 9817.
Final Office Action (Mail Date Apr. 11, 2013) for U.S. Appl. No. 12/610,140, filed Oct. 30, 2009, Confirmation No. 9817.
Response (Dec. 31, 2012) for U.S. Appl. No. 12/610,140, filed Oct. 30, 2009, Confirmation No. 9817.
Office Action (Mail Date Aug. 30, 2012) for U.S. Appl. No. 12/610,140, filed Oct. 30, 2009, Confirmation No. 9817.
Response (Jul. 23, 2012) for U.S. Appl. No. 12/610,140, filed Oct. 30, 2009, Confirmation No. 9817.
Office Action (Mail Date Apr. 24, 2012) for U.S. Appl. No. 12/610,140, filed Oct. 30, 2009, Confirmation No. 9817.
Publication (May 5, 2011) for U.S. Appl. No. 12/610,140, filed Oct. 30, 2009, Confirmation No. 9817.
Raman et al., Universal Inbox: Providing Extensible Personal Mobility and Service Mobility in an Integrated Communication Network, 0-7695-0816-2/00 copyright 2000 IEEE, pp. 95-106.
U.S. Cellular, Cell Phone Bill Example, Retrieved from Internet Jan. 16, 2013, URL: http://www.uscellular.com/support/customer-care/billing/billing-examples.html, 5 pages.
Mobile Bill Analysis Report, Vodafone, Presented by CJ's, Nov. 17, 2008, 5 pages.
BT.com, At home, Your account, Billing, Retrieved Jan. 16, 2013, URL: http://www.2.bt.com/static/i/beta/understandmybill/mobilepages/mobile_usage_charges.html, 1 page.
Authors: IBM, SyncGene, Global Mobility Information Model, ip.com, IP.com No. IPCOM000185996D, Original Publication Date: Aug. 5, 2009, 22 pages.
Office Action (Apr. 17, 2015) for U.S. Appl. No. 14/051,528, filed Oct. 11, 2013, Conf. No. 4221.
Amendment (Jul. 14, 2015) for U.S. Appl. No. 14/051,528, filed Oct. 11, 2013, Conf. No. 4221.
Notice of Allowance (Sep. 23, 2015) for U.S. Appl. No. 14/051,528, filed Oct. 11, 2013, Conf. No. 4221.

* cited by examiner

GLOBAL MOBILITY INFRASTRUCTURE FOR USER DEVICES

This application is a continuation application claiming priority to Ser. No. 14/051,528, filed Oct. 11, 2013, now U.S. Pat. No. 9,253,618, issued Feb. 2, 2016, which is a Continuation of Ser. No. 12/610,140, filed Oct. 30, 2009, U.S. Pat. No. 8,750,824, issued Jun. 10, 2014.

FIELD OF THE INVENTION

The invention relates generally to user devices, and more particularly, to a system and method for providing a global mobility infrastructure for mobile and stationary user devices.

BACKGROUND

Wireless mobile devices, especially those that are user-centric, are becoming common and essential in people's daily activities. Many business organizations are investing in mobile devices and the associated support infrastructures to improve the accessibility and effectiveness of their mobile workers. Currently, these mobile devices are mainly supported by the telecommunications infrastructures and the Internet. Examples of such mobile devices include mobile telephones and the Blackberry products developed by Research in Motion Limited (RIM). The mobile devices of the future, however, will likely be integrated mobile devices that provide a wide range of functions depending on the mobility environment which the user or subscriber is in at any moment. The environment could be the user's office building, the user's automobile, a public transportation system, a business premise or the user's home.

As society becomes increasingly mobile, people spend more time traveling to and from their offices, homes, and other destinations, typically in their cars or in other means of public transportation. In order to receive uninterrupted wireless support in different environments and the benefits provided by the various mobility systems, the characteristics concerning the user and the devices, both mobile and stationary, must be automatically updated and seamlessly available to the user at all times. This requirement is generally referred to as user global mobility.

A global mobility support environment enables a user to access the various mobile and stationary devices, and seamlessly operate the devices in different environments while still receiving the same services. These services might include the access to one's data, the availability of customized services, and the transparent access to subscribed mobility functions with the same user characteristics. In addition to supporting the various user devices, the mobility infrastructure must be capable of managing the various subscriber bases associated with the devices and the user.

For example, a sales person may be carrying a mobile device as the person leaves an office complex and enter a car. The mobile device would detect the change in the operating environment and switch to a different mobile user profile for the car environment, as well as enabling the mobile functions applicable to the car environment. Similarly, as the sales person approaches and enters the house, the same mobile device detects another change in the operating environment and switches to the user mobility profile for the home environment, and makes the home mobile functions available to the person.

While the number of different mobile devices being introduced in the market continues to increase, there has been little work in addressing the global mobility requirement for these devices to provide non-disruptive and seamless support services.

In the telecommunications field, global mobility is typically provided by an infrastructure that maintains a subscriber's information to the extent of supporting the subscribed services within the subscriber's operational domain. For mobile wireless services, the subscription details are part of an operational environment which is dynamically updated as the user's location changes. However, for the services that still depend on an wired infrastructure, the global mobility support for maintaining the dynamic nature of the user/subscriber information is still lagging far behind. Furthermore, the mobility support for some operational domains are so rudimentary that it is often difficult just to maintain the services intact when there is a change in the operating environment.

In the cellular telephone domains that use CDMA, GSM, and 3G technologies, the tracking and updating of a subscriber's mobility information is limited to the change in the subscriber's location relative to the radio plan in which the subscriber is operating. The information is usually based on a location area code and highly dependent on the accuracy of the mobile cellular density. The introduction of new radio technologies like WiMax improves the accuracy of the location change information, which in turn provides more acceptable mobility data on the subscriber. However, the telecommunication domains that use signal strength for computing the subscriber's position still lack a reliable method for deriving and updating the subscriber's mobility data when the subscriber enters a new operating environment.

From the foregoing it is appreciated that there exists a need for a global mobility infrastructure that can accept variety of mobility information and seamlessly support a diverse range of mobile devices in various operating environments.

SUMMARY

The present invention relates to a global mobility system and method for providing a global mobility framework. An embodiment of the system includes a mobility data collection component, a data management component, and a device management component. The data collection component acquires real-time mobility data relating to a user and the mobile and stationary devices associated with the user. The data management component manages the collected mobility data and applies the data to a device being used in a respective mobility environment. The device management component activates and controls the operation of the device based on the available device, user and environmental data and the services subscribed by the user.

The data collection component generates a mobility profile based on the user service requirements of the user and the collected mobility data. The mobility profile corresponds to a particular device in a particular operating environment and any customer service level agreement (SLA) between the user and a mobility service provider. The service level agreement might include different service support grades where each is associated with a group of user devices and a group of mobility functions.

The mobility data management component configures a device using the collected mobility data to prepare the device for operation in a respective environment. The data management component further updates the a profile database with new mobility data relating to the location of the user and the device as the user leaves one operating environment and enters another. The new data might include mobility and environmental data relating to a third party that is relevant to the user and the operation of the mobile or stationary device that is currently active. The latest mobility data is used for subsequent mobility actions affecting the user and the operation of the device. The data management component further stores the collected data in a mobility profile database that includes static information about the user as well as mobility data about the devices and the surrounding environments affecting the user. The mobility information is dynamically updated to reflect the location of the user, the mobile and stationary devices in use and the current operating environment.

The device management component activates and deactivates a device in use based on the collected mobility data. The device management component further prepares work flows on the behavior of a mobile device or a stationary device based on the collected mobility data. The device management component also provides real-time control of a device in use based on the collected mobility data. This device control includes automated commands for providing mobility functions to the user as well as semi-automatic and manual intervention in the operation of the devices.

In another aspect of the invention, a computer implemented method for providing a global mobility framework to seamlessly support mobile and stationary devices in different environments is described. The method includes the steps of collecting real-time mobility data relating to a user and a plurality of mobile or stationary devices associated with the user, applying the collected data to a device being used in a respective environment, and activating and controlling the operation of the device based on the applied data. The method further includes the steps of generating a user mobility profile based on service requirements of the user and a user device, and storing the profile in a mobility database.

The method further configures the mobile or stationary device based on the collected mobility data to prepare the device for operation in a respective environment, and updates the mobility database with new data relating to the location of the user as the user enters a new operating environment. The device is then activated or deactivated based on the collected mobility data. The device operation is controlled by the global mobility system based on data in the mobility database as well as data being acquired in real time.

In yet another aspect of the invention, a computer program product is described for use with a computer for providing a global mobility framework to seamlessly support mobile or stationary user devices in various environments. The program product includes a computer usable storage medium having readable program code operable to collect real-time mobility data relating to a user and a plurality of devices associated with the user, apply the collected data to a device being used in a respective environment, and activate and control the operation of the device based on the applied data.

The details of the embodiments of the invention, both as to their structure and operation, are described below in the Detailed Description section in reference to the accompanying drawings, in which like reference numerals refer to like parts. This Summary is intended to identify key features of the claimed subject matter, but it is not intended to be used to limit the scope of the claimed subject matter.

DETAILED DESCRIPTION

Figure 1:
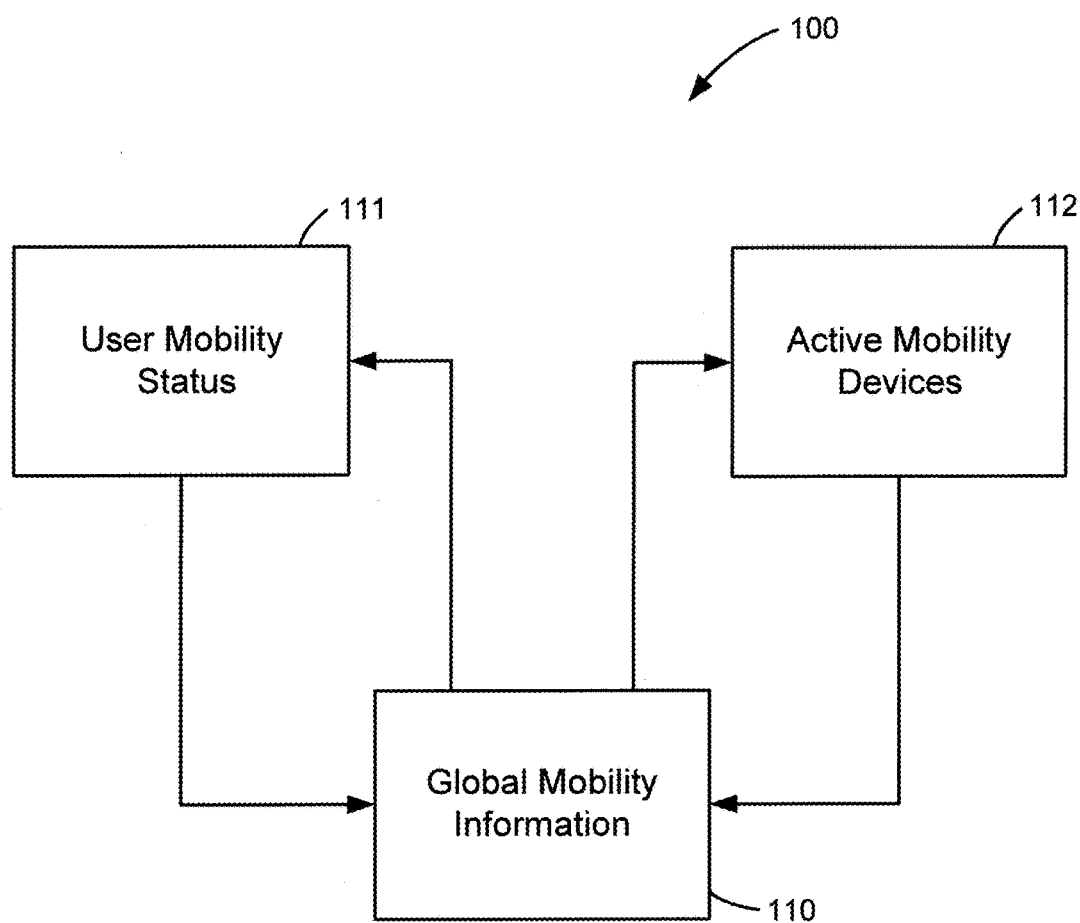
FIG. 1 is a block diagram illustrating the relationship between the mobility status of a user, the user's active devices and the global mobility information, in accordance with aspects of the invention.

The invention relates generally to communications for a mobile user and the mobile and stationary devices associated with the user. More specifically, the invention provides a global mobility system and method for seamlessly supporting a wide range of devices in various mobility environments as the user moves from one environment to another.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a high-level block diagram showing the relationship among the components of an embodiment of a global mobility system 100 in accordance with aspects of the invention. Block 110 represents the global mobility information about the user and the mobile and stationary devices associated with the user. The global mobility information 110 is continuously collected and maintained by the system 100. This information includes updates about the user mobility status 111 as well as real-time data about the mobile and non-mobile devices being used by the user. The active mobility device data is represented by block 112. The user mobility status 111 includes mobility and static data about the user as well as any updates to the mobility data as the user goes through various states of modifying the data either manually or automatically. The mobility data and updates will have quantitative and qualitative impacts on the devices associated with the user in the user's ecosystem. The information flow between the user global mobility information 110 and the user mobility status 111 represents the continuous data updating between these two components.

The active mobility devices block 112 represents information concerning the mobile and non-mobile devices associated with or used by the user (subscriber). This information includes device registrations, service subscriptions and device intelligence to receive user mobility data and commands relating to the configuration and operation of the devices. The data flow between the global mobility information 110 and the active mobility devices 112 represents interactions between these components, which might include data as well as control commands.

Figure 2:
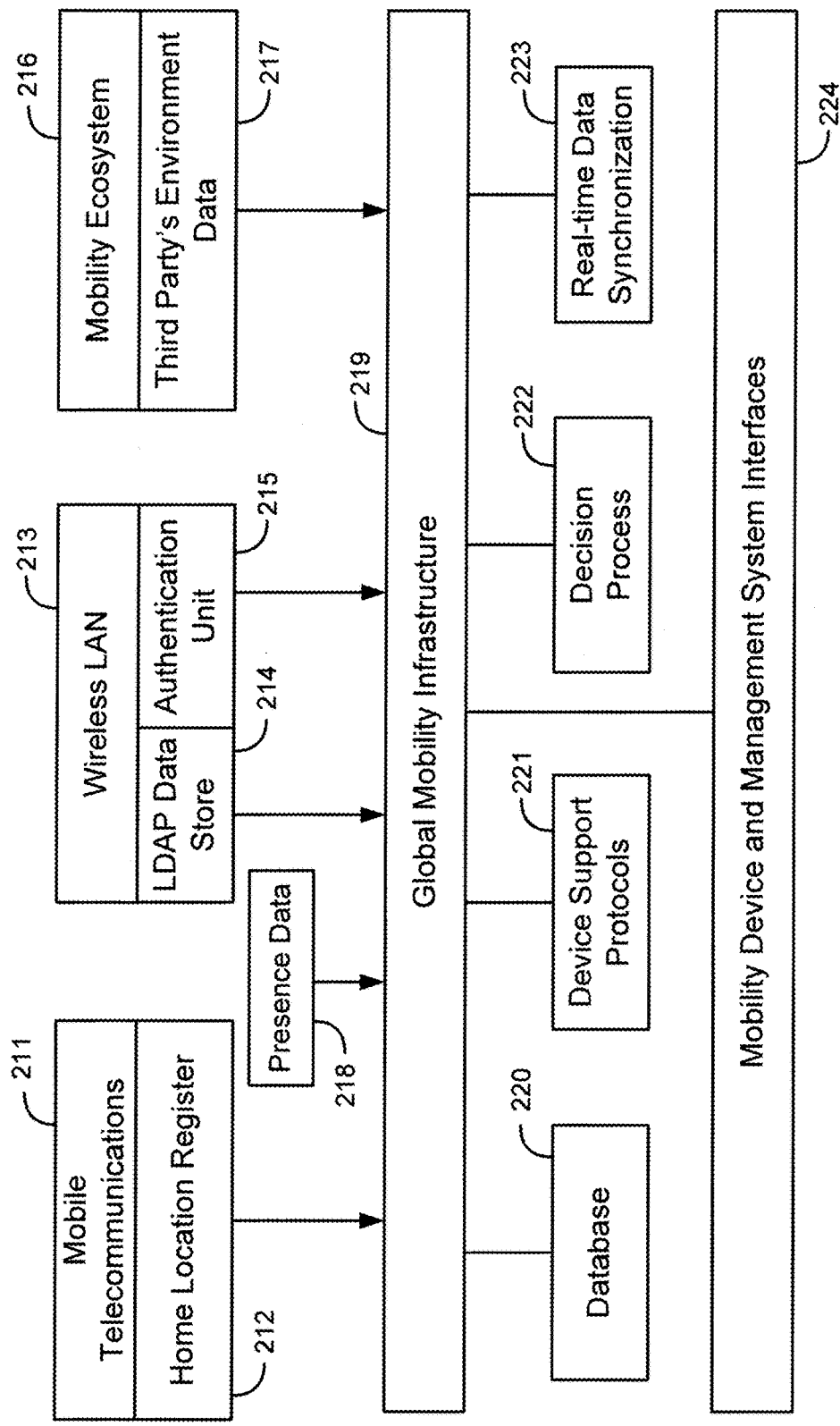
FIG. 2 is a block diagram showing the interaction between the global mobility system and devices in different mobile communications environments, in accordance with aspects of the invention.

FIG. 2 is a block diagram showing further details of a global mobility system 200 and its relationship to different mobility environments and device interfaces. The system 200 includes a global mobility infrastructure 219 through which the mobile networks interact with the system. For example, as shown in FIG. 2, a mobile telecommunications network 211 (such as a cellular phone network) might interact with the global mobility infrastructure 219 through its home location register 212. A wireless local area network (LAN) 213 might interact with the global mobility infrastructure 219 through a Lightweight Directory Access Protocol (LDAP) data store 214 and authentication unit 215. A mobility ecosystem 216 might interact with the global mobility infrastructure 219 through a third-party's environment data 217. The mobility ecosystem 216 might include data concerning the physical terrains surrounding the user or weather in the area. The third-party environment data 217 might include information about hazardous conditions near the user that is broadcast by another entity. Likewise, information from a "Presence" implementation 218 might also be sent to the global mobility system through the infrastructure 219.

The global mobility system further includes a database 220 for storing and managing user mobility data, user profiles and device profiles. The communication protocols that the global mobility system employs to communicate with the mobile and non-mobile devices are represented by block 221. The system 200 further includes the necessary decision support logic 222, either in hardware, software or a combination thereof, to generate appropriate work flows and control commands for the devices. In addition, a real-time data synchronization component 223 synchronizes the acquired mobility data with the data currently in the database 220. The global mobility infrastructure 219 communicates with the user's devices and their management systems through the mobility device and management system interfaces 224.

Figure 3:
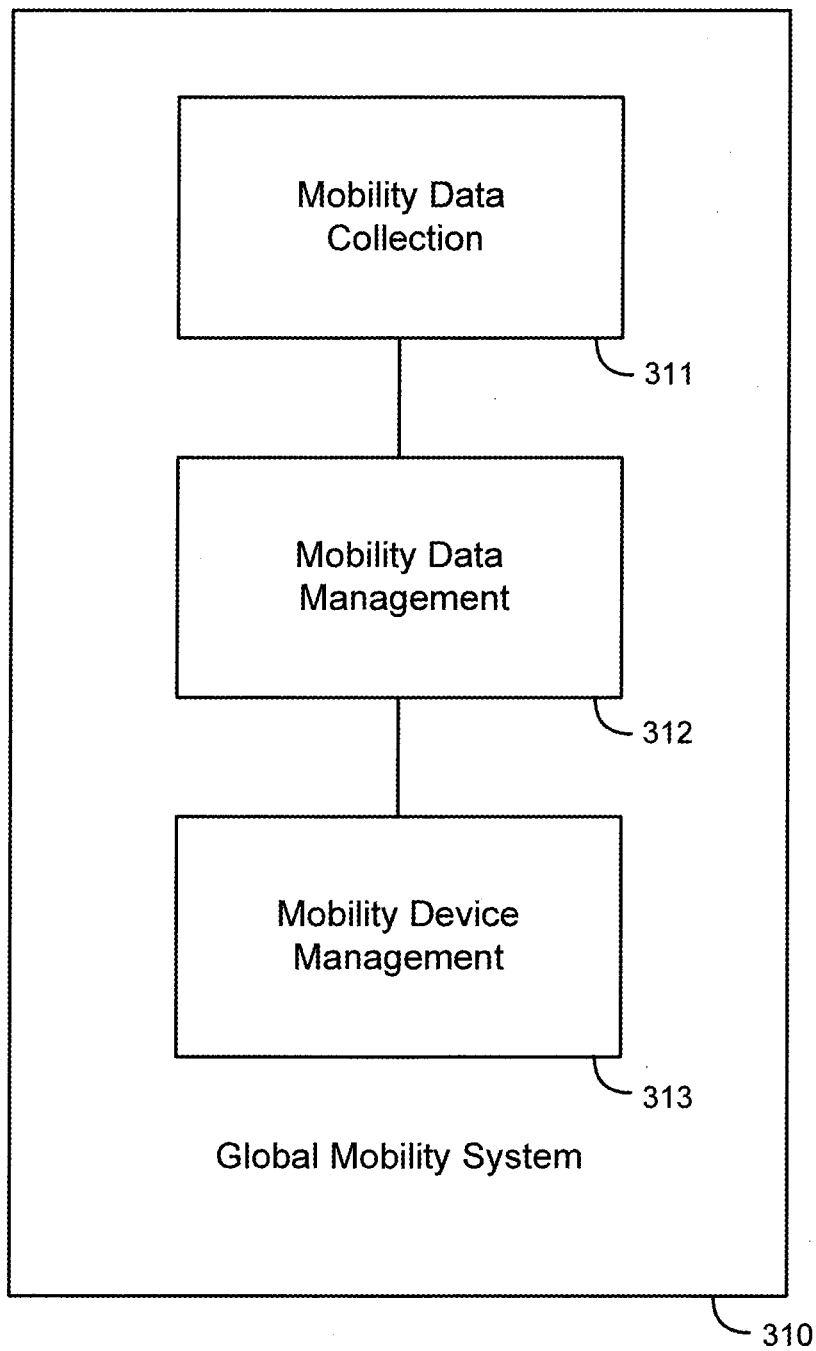
FIG. 3 is a block diagram showing the main components of the global mobility system in accordance with aspects of the invention.

FIG. 3 is a block diagram showing the main components of an embodiment of a global mobility system 310 according to aspects of the invention. A mobility data collection component 311 acquires real-time data about the user's location through a mobile or stationary device that the user is currently using. Further details on the functions performed by the mobility data collection component 311 are described below in reference to FIGS. 4 and 5.

The global mobility system 310 includes a mobility data management component 312 for processing the data collected by the collection component 311, including synchronizing the collected data with what being stored in the global mobility system's database. The mobility data management component 312 further provides a particular device being used with the most recently updated data in the database about the device. Further details on the functions performed by the mobility data management component 312 are described below in reference to FIGS. 4 and 5.

The global mobility system 310 further has a mobility device management component 313 for activating and deactivating a user device, and controlling its operation, based on the collected mobility data.

Figure 4:
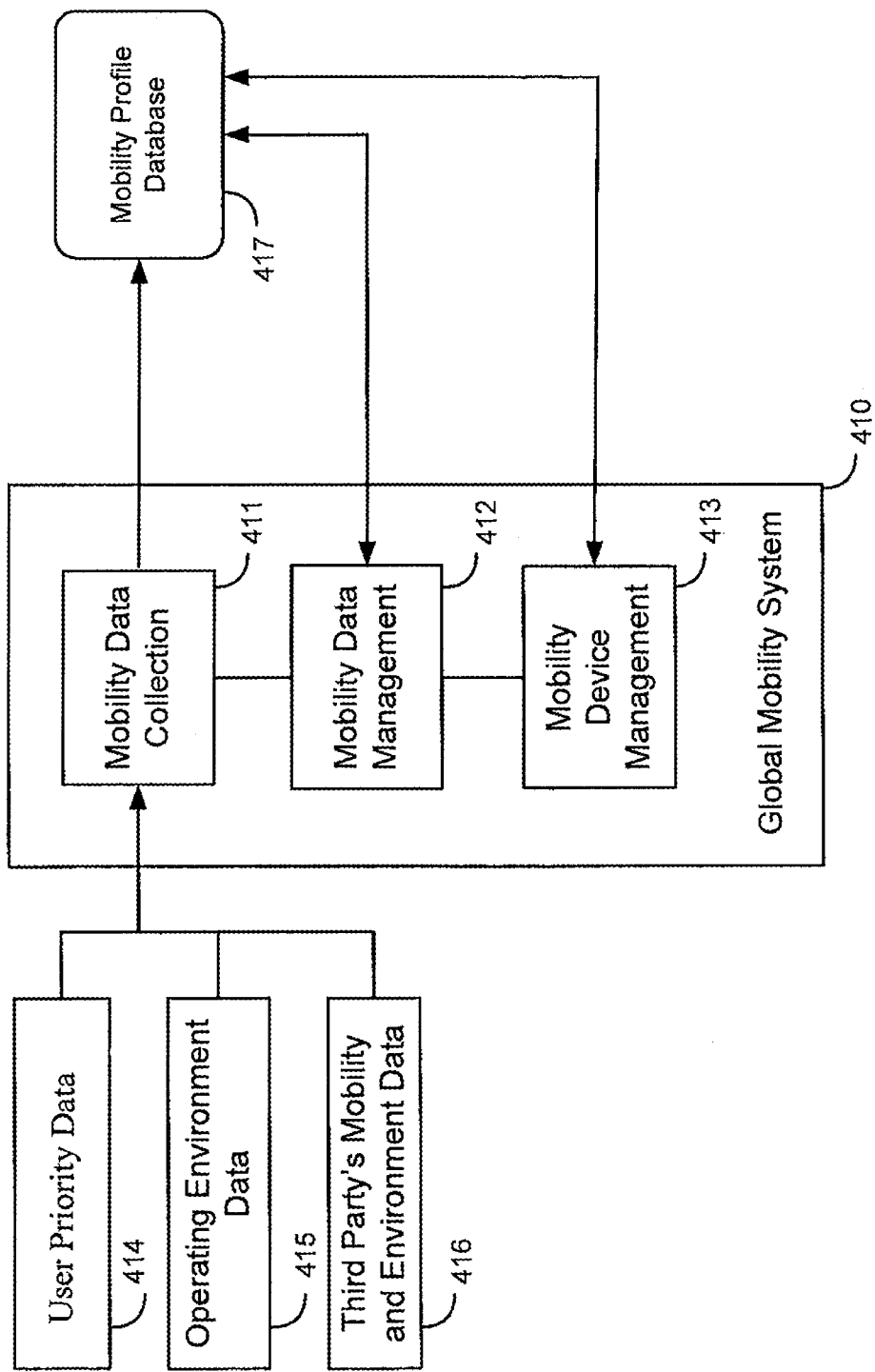
FIG. 4 [Romelia F1] is a block diagram showing the interactions among the key components of the global mobility system, mobility data sources and the mobility profile database, in accordance with aspects of the invention.

FIG. 4 is a block diagram showing more details on the operations performed by the main components of a global mobility system 410 and their interactions with each other. The sources of the data collected by the mobility data collection 411 include user mobility data 414, operating environment data 415, and any third-party's mobility and environment data 416. The user mobility data 414 include mobility and static data about the user as well as any updates to the mobility data as the user goes through various states of modifying the data either manually or automatically. The operating environment data 415 typically include information about the user's physical surroundings such as a building or a vehicle and the mobility services associated with them. For example, the operating environment data 415 at the user's office likely include the mobility services relating to the user's office work whereas the environment data 415 while the user is at home would concern with the user's home automation devices and services. Sometimes, a third-party that has a relationship with the user's mobility environment or the user's devices might also have certain mobility or environment data that is relevant to the user or the devices. In such a case, the data collection component 411 also receives the third-party's mobility data from block 416.

Once the user mobility data, operating environment data, and any third-party's data, is collected, the collection component 411 sends the data to the mobility profile database 417. The mobility data management component 412 is responsible for organizing and updating data in the database 417. It also retrieves the appropriate mobility profiles for the user and the devices and provides the profiles to the mobility device management component 413. The device management component 413 uses these profiles to activate, deactivate and control the operation of the devices in use. Further details on the operations of the device management component are described below in reference to FIG. 7.

Figure 5:
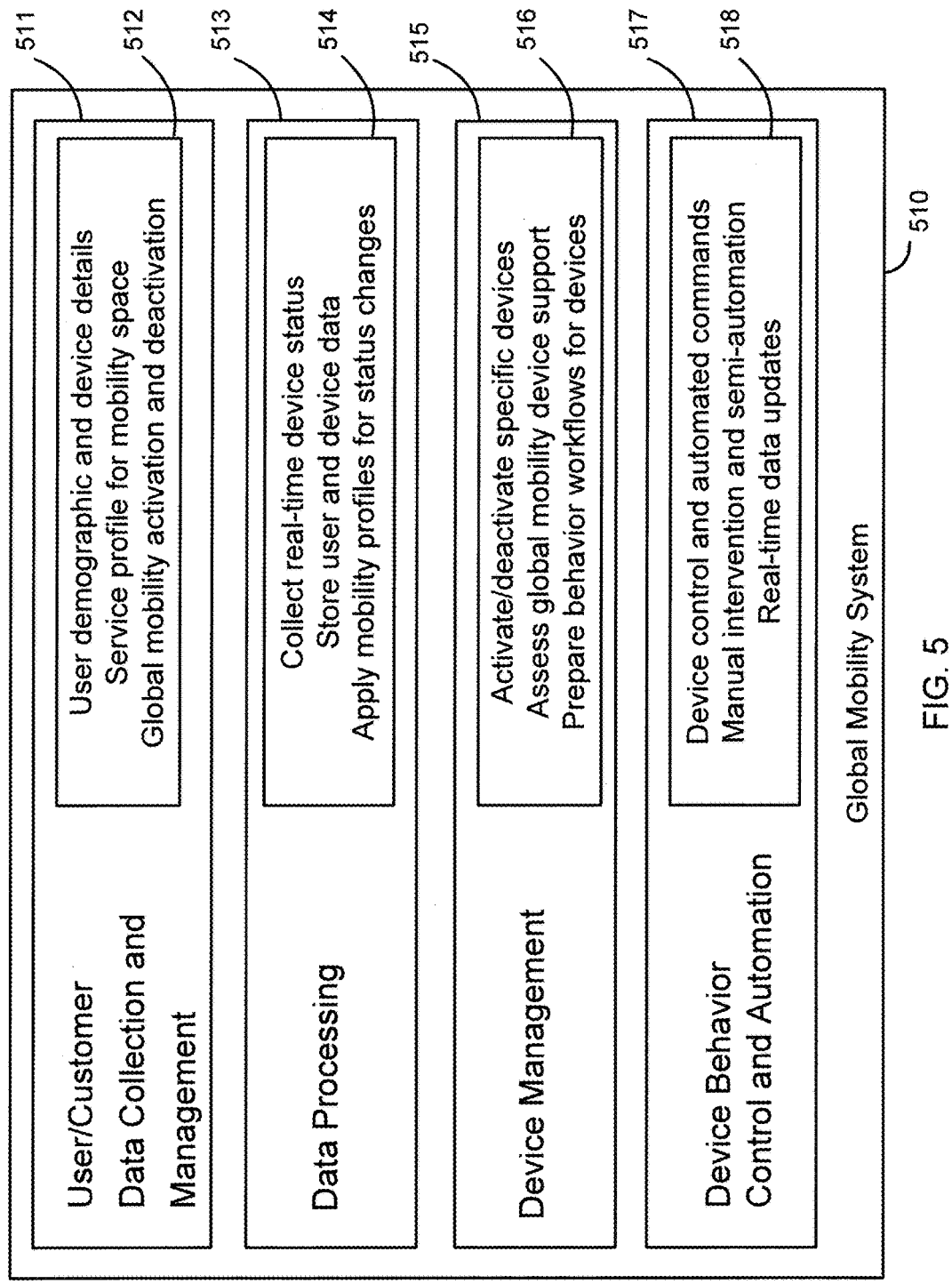
FIG. 5 is [Romelia F2] a block diagram illustrating the main tasks performed by the components of the global mobility system, in accordance with aspects of the invention.

FIG. 5 is a block diagram showing another embodiment of a global mobility system according to aspects of the invention. The mobility system 510 includes a user/customer mobility data collection and management component 511 for performing the operations listed in block 512. These operations include collecting user demographic data and device details, the service profiles for the user in the respective mobility environments, and data relating to the activation and deactivation of the user's devices. A data processing component 513 receives the real-time status of a device from the collection component 512 and stores the device and user data into the system's database. The data processing component 513 also applies an appropriate mobility profile to the device when the status of the device changes. The operations performed by the data processing component 513 are shown in block 514.

The system 510 also includes a device management component 515 for activating and deactivating a user device as the user leaves one operating environment and enters another environment. The device management component 515 assesses the mobility support of the device based on the current data in the mobility database, the device status, and the operating environment. The device management component 515 then configures the user device and prepares its behavior work flows based on the data available to the global mobility system 510. The device management operations are shown in block 516 of FIG. 5.

The global mobility system 510 further includes a device behavior and control and management component 517 for controlling the operation of a user device and providing commands to the device. The commands might be in the form of automated procedures or semi-automated procedures. In addition, the device behavior control and management component 517 is capable of enabling manual intervention to the device when needed and periodically updating the device data in real time. The operations performed by the device behavior control component 517 are shown in block 518.

Figure 6:
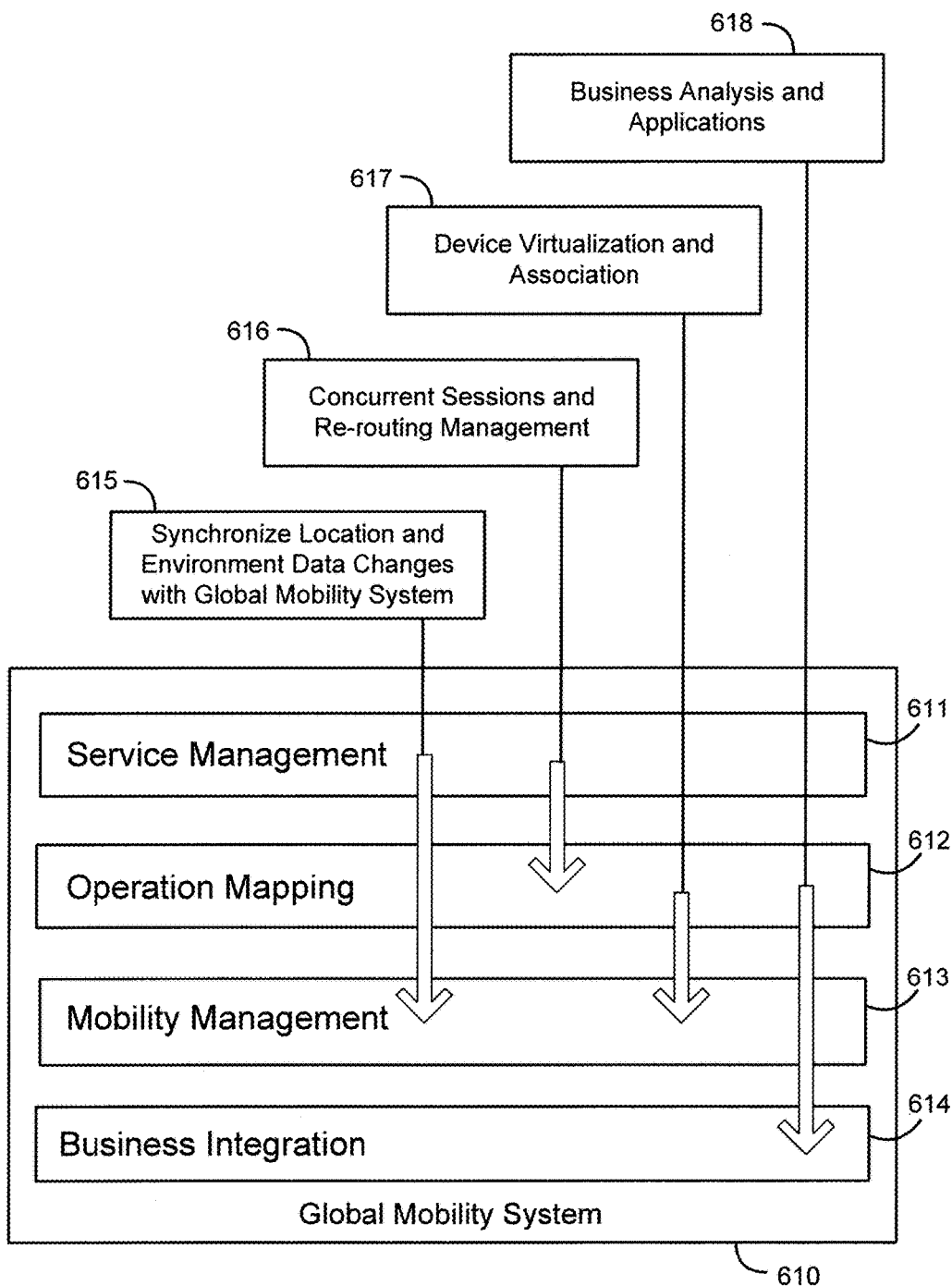
FIG. 6 is [Romelia F3] a block diagram illustrating an embodiment of the global mobility infrastructure in a business application environment.

FIG. 6 is a block diagram illustrating an exemplary embodiment of a global mobility system 610, as implemented in a business environment, in accordance with aspects of the invention. The global mobility system 610 includes a mobility management component 613 that provides the mobility management functions described above in reference to FIGS. 1-5. A service management component 611 manages the mobility services that a user has subscribed from a service provider. An operation mapping component 612 correlates the subscribed services to the related mobility parameters and functions that are provided by the mobility management component 613. A business integration component 614 supplies the results from the operation mapping component 613 to respective business applications to generate the business analysis information that has been subscribed by the user.

FIG. 6 further shows examples of the interactions among the components of the global mobility system 610. The interactions are represented by the data flows between the components of the system 610 and their associated operations. Block 615 shows the synchronization of the location and environment data changes with the system's database. The data synchronization takes place between the service management component 611 and the mobility management component 613. The management of concurrent mobility sessions and service re-routing are shown in block 616, which are performed by the service management component 611 and the operation mapping component 612. The operation mapping component 612 also interfaces with the mobility management component 613 to provide device virtualization and association, as depicted in block 617. Block 618 shows the business analysis and applications that are relevant to the business services subscribed by the user. These business analysis and applications are integrated into the services provided to the user by the business integration component 614 based on the results generated by the operation mapping component 612.

Figure 7:
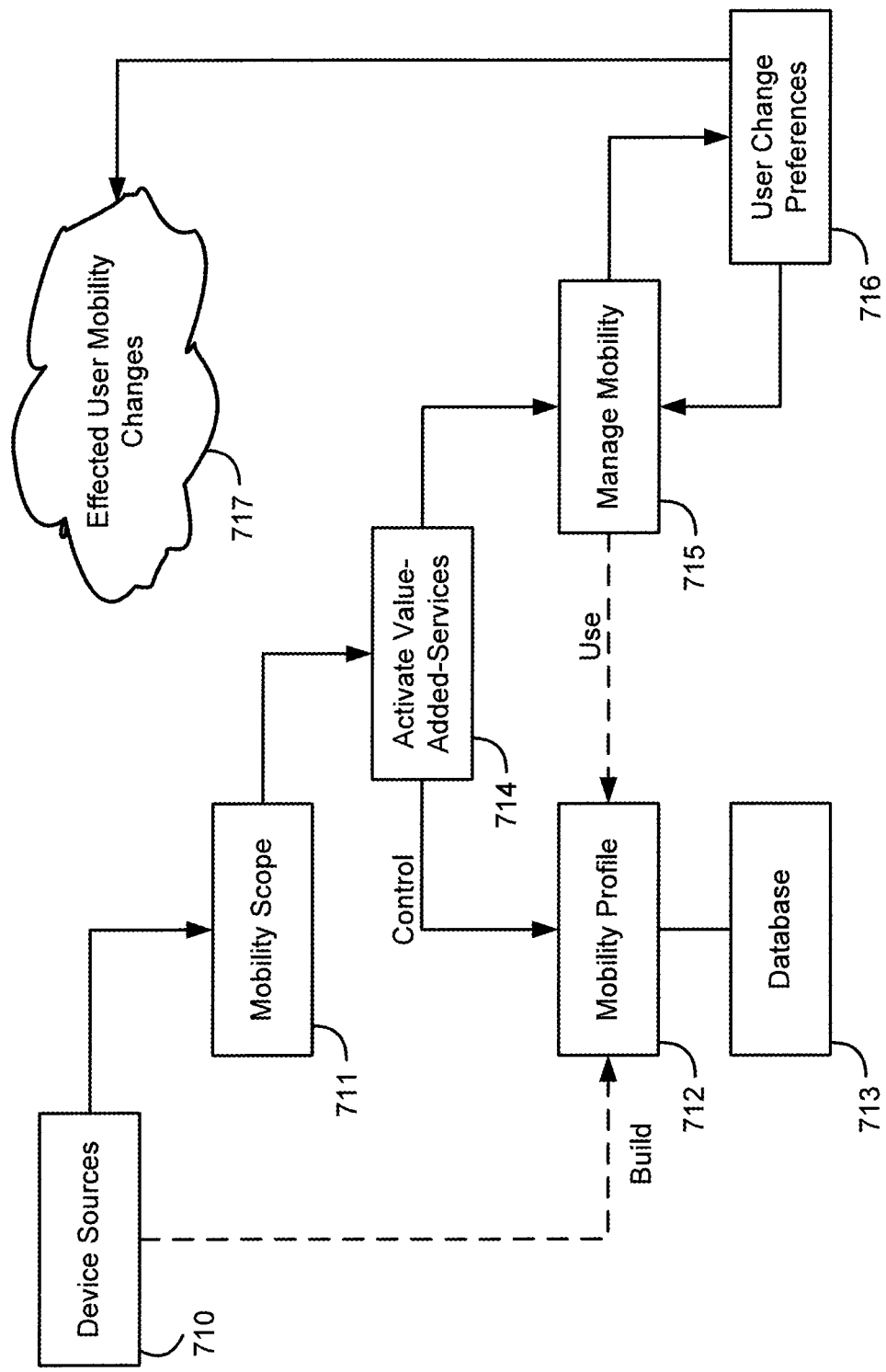
FIG. 7 is [Romelia F4] a block diagram showing more details of an embodiment of the global mobility infrastructure in accordance with aspects of the invention.

FIG. 7 is a block diagram showing further details of the operations performed by the components of the global mobility system described in reference to FIGS. 1-5. At block 710, the system identifies the sources of the mobility data that it is collecting. It is important for the system to know where the data comes from because the user might be in a different operating mobility domain at any give time and the collected data must be associated with the correct domain. The device source information is used to build a mobility profile for the device, as shown by block 712. The device mobility profile is stored in the system's database 713.

At block 711, the user devices identified by the system are brought into the mobility scope of the system and under the control of the system. Once under the system's control, the devices are ready to be activated or deactivated by the global mobility system. At block 714, the devices and associated mobility profiles are activated and ready for receiving commands from the global mobility system. At block 715, the system interacts with the devices and manages the mobility data and operations of the devices according to the compiled mobility profiles and subscribed services. The system also updates its database with any changes in the mobility data concerning the a user device or the operating environment that it receives in real time.

The user might request a temporary or permanent change to the user's subscribed mobility services. For example, the user might wish to disable a subset of the mobility functions for a mobile device while traveling in a co-worker's automobile. Such a user change is indicated by block 716. The user change is received and processed by the mobility management component 715. If the user change is permanent, then the mobility management component 715 might need to partially or fully deactivate certain mobility services associated with the user and the device. The effected mobility changes requested by the user are represented by block 717.

Figure 8:
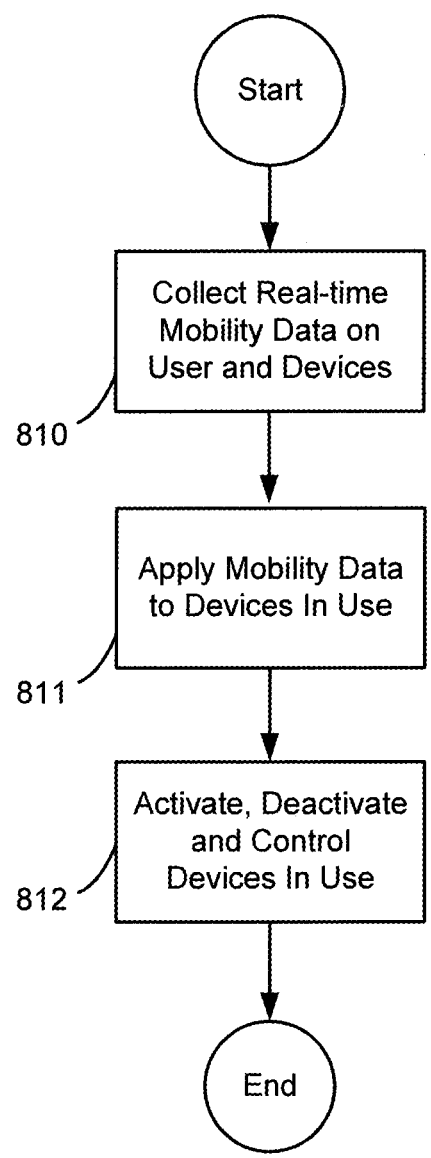
FIG. 8 is [Romelia F5] a flow chart representing a high-level process for acquiring mobility data, applying the mobility data to the devices and controlling the devices, in accordance with aspects of the invention.

FIG. 8 is a high-level flow chart of an exemplary process for providing a global mobility framework according to aspects of the invention. At step 810, real-time data on the user and devices are collected through the devices and the surrounding operating environments. At step 811, the collected data is applied to the devices in use to prepare them for operation. At step 812, the devices in use are activated and controlled to provide the user with the mobility services.

Figure 9:
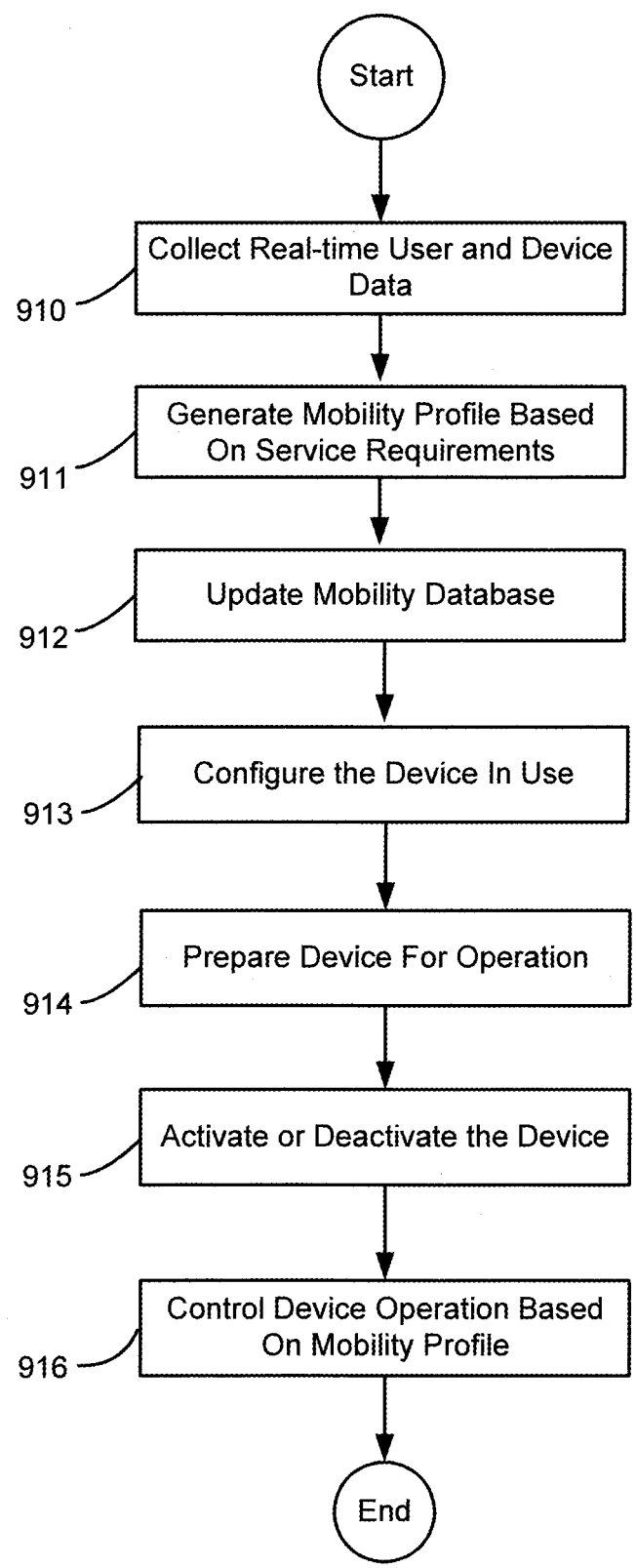
FIG. 9 is a flow chart showing further details of the process represented by the flow chart of FIG. 8.

FIG. 9 is a flow chart showing further details of an exemplary process for providing a global mobility framework according to aspects of the invention. At step 910, real-time user and device data are obtained from a device and the operating environment. Based on the user's subscribed service requirements and collected data, a mobility profile is generated for the user and device in the operating environment, at step 911. The global mobility system is updated with the generated profile at step 912. At step 913, the device is configured for operation based on the generated profile and other parameters relating to the user, device, and operating environment as currently stored in the database. The system further prepares the device for operation at step 914 through automated or semi-automated commands and procedures. The device is then activated (and perhaps deactivated at a later time) at step 915. At step 916, the system controls the device's operation to provide its mobility functions to the user based on the generated mobility profile.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A method, said method comprising:
    collecting, by a computer processor:
        real-time mobility data relating to a user and a plurality of devices associated with the user, said plurality of devices including a mobile device; and
        operating environment data comprising information about the user's physical surroundings and mobility services associated with the user's physical surroundings;
    said processor updating a mobility database with new data relating to the location of the user as the user enters a new operating environment upon leaving a prior operating environment, wherein the new data includes mobility and environmental data relating to a third-party, said third-party data being relevant to the user and to operation of the mobile device,
wherein the mobility and environmental data relating to the third-party is based on a relationship that the third party has with the user's mobility environment; and
    after said updating the mobility database, said processor:
        configuring the mobile device to prepare the mobile device for operation, based on the collected real-time mobility data;
        activating the mobile device for subsequent operation, based on the collected real-time mobility data; and
        controlling operation of the activated mobile device, based on the new data in the mobility database and other data being acquired in real time.

2. The method of claim 1, wherein the method further comprises:

said processor generating a user mobility profile based on service requirements of the user and the collected real-time mobility data.

3. The method of claim 2, wherein the mobility profile corresponds to a customer service level agreement (SLA) between the user and a mobility service provider, wherein the service level agreement includes different service support grades each associated with a group of user devices and a group of mobility functions.

4. The method of claim 2, wherein the mobility profile is stored in a mobility profile database, wherein the device is configured for operation based on the mobility profile and other parameters relating to the user, the device, and an operating environment as currently stored in the mobility profile database, and wherein the method further comprises:
said processor retrieving the mobility profile from the mobility profile database; and
said processor utilizing the mobility profile for said activating the mobile device and said controlling the operation of the activated mobile device.

5. The method of claim 1, wherein the method further comprises:
said processor further storing the collected real-time mobility data in a mobility profile database, wherein the mobility profile database includes static information about the user and mobility information about the devices associated with the user; and
said processor dynamically updating the mobility information to reflect the location of the user, the devices in use, and the environment.

6. The method of claim 1, wherein the method further comprises:
said processor preparing a work flow for the behavior of a device based on the collected real-time mobility data; and
said processor providing real-time control of a device in use based on the collected real-time mobility data.

7. The method of claim 1, wherein the method further comprises:
said processor managing mobility services that the user has subscribed to from a service provider;
said processor generating a correlation between the mobility services and related mobility parameters and functions; and
said processor supplying the correlation to respective business applications to generate business analysis information that has been subscribed to by the user.

8. A computer program product, comprising a computer readable storage device having computer readable program code stored therein, said program code containing instructions executable by a computer processor to implement a method, said method comprising:
said processor collecting:
real-time mobility data relating to a user and a plurality of devices associated with the user, said plurality of devices including a mobile device; and
operating environment data comprising information about the user's physical surroundings and mobility services associated with the user's physical surroundings;
said processor updating a mobility database with new data relating to the location of the user as the user enters a new operating environment upon leaving a prior operating environment, wherein the new data includes mobility and environmental data relating to a third-party, said third-party data being relevant to the user and to operation of the mobile device,
wherein the mobility and environmental data relating to the third-party is based on a relationship that the third party has with the user's mobility environment; and
after said updating the mobility database, said processor:
configuring the mobile device to prepare the mobile device for operation, based on the collected real-time mobility data;
activating the mobile device for subsequent operation, based on the collected real-time mobility data; and
controlling operation of the activated mobile device, based on the new data in the mobility database and other data being acquired in real time.

9. The computer program product of claim 8, wherein the method further comprises:
said processor generating a user mobility profile based on service requirements of the user and the collected real-time mobility data.

10. The computer program product of claim 9, wherein the mobility profile corresponds to a customer service level agreement (SLA) between the user and a mobility service provider, wherein the service level agreement includes different service support grades each associated with a group of user devices and a group of mobility functions on the collected mobility data to prepare the device for operation in a respective environment.

11. The computer program product of claim 9, wherein the mobility profile is stored a mobility profile database, wherein the device is configured for operation based on the mobility profile and other parameters relating to the user, the device, and an operating environment as currently stored in the mobility profile database, and wherein the method further comprises:
said processor retrieving the mobility profile from the mobility profile database; and
said processor utilizing the mobility profile for said activating the mobile device and said controlling the operation of the activated mobile device.

12. The computer program product of claim 8, wherein the method further comprises:
said processor further storing the collected real-time mobility data in a mobility profile database, wherein the mobility profile database includes static information about the user and mobility information about the devices associated with the user; and
said processor dynamically updating the mobility information to reflect the location of the user, the devices in use, and the environment.

13. The computer program product of claim 8, wherein the method further comprises:
said processor preparing a work flow for the behavior of a device based on the collected real-time mobility data; and
said processor providing real-time control of a device in use based on the collected real-time mobility data.

14. The computer program product of claim 8, wherein the method further comprises:
said processor managing mobility services that the user has subscribed to from a service provider;
said processor generating a correlation between the mobility services and related mobility parameters and functions; and
said processor supplying the correlation to respective business applications to generate business analysis information that has been subscribed to by the user.

15. A system, comprising a computer processor, a memory coupled to the processor, and a computer readable storage device coupled to the processor, said storage device containing program code executable by the processor via the memory, said processor configured to collect real-time mobility data relating to a user and a plurality of devices associated with the user, said plurality of devices including a mobile device;

said processor configured to collect operating environment data comprising information about the user's physical surroundings and mobility services associated with the user's physical surroundings;

said processor configured to update a mobility database with new data relating to the location of the user as the user enters a new operating environment upon leaving a prior operating environment, wherein the new data includes mobility and environmental data relating to a third-party, said third-party data being relevant to the user and to operation of the mobile device, wherein the mobility and environmental data relating to the third-party is based on a relationship that the third party has with the user's mobility environment; and said processor configured to, after the database has been updated:

configure the mobile device to prepare the mobile device for operation, based on the collected real-time mobility data;

activate the mobile device for subsequent operation, based on the collected real-time mobility data; and control operation of the activated mobile device, based on the new data in the mobility database and other data being acquired in real time.

16. The system of claim 15, said processor configured to generate a user mobility profile based on service requirements of the user and the collected real-time mobility data.

17. The system of claim 16, wherein the mobility profile corresponds to a customer service level agreement (SLA) between the user and a mobility service provider, wherein the service level agreement includes different service support grades each associated with a group of user devices and a group of mobility functions.

18. The system of claim 16, wherein the mobility profile is stored a mobility profile database, wherein the device is configured for operation based on the mobility profile and other parameters relating to the user, the device, and an operating environment as currently stored in the mobility profile database, said processor configured to retrieve the mobility profile from the mobility profile database; and said processor configured to utilize the mobility profile for said activating the mobile device and said controlling the operation of the activated mobile device.

19. The system of claim 15, said processor configured to store the collected real-time mobility data in a mobility profile database, wherein the mobility profile database includes static information about the user and mobility information about the devices associated with the user; and said processor configured to dynamically update the mobility information to reflect the location of the user, the devices in use, and the environment.

20. The system of claim 15, said processor configured to prepare a work flow for the behavior of a device based on the collected real-time mobility data; and said processor configured to provide real-time control of a device in use based on the collected real-time mobility data.

* * * * *